United States Patent Office 3,842,030
Patented Oct. 15, 1974

3,842,030
PROCESS FOR PREPARING COLORED SYNTHETIC LEATHER
Shigeo Maeda, Minoru Ozutsumi, Isao Niimura, and Hideo Okazaki, Tokyo, Japan, assignors to Hodogaya Chemical Co., Ltd., Tokyo, Japan
No Drawing. Filed July 5, 1973, Ser. No. 376,365
Claims priority, application Japan, July 26, 1972, 47/74,162
Int. Cl. C08g 51/66
U.S. Cl. 260—37 N  10 Claims

ABSTRACT OF THE DISCLOSURE

A colored polyurethane synthetic leather is prepared by reacting a copper phthalocyanine dye having the formula $$\text{CuPc} \begin{matrix} (SO_2NRR_1)_x \\ (SO_3^{\ominus}NH^{\oplus}R_2R_3)_y \\ | \\ H \end{matrix} \quad (1)$$

wherein CuPc represents a chlorinated or non-chlorinated copper phthalocyanine; R represents hydrogen, alkyl, or hydroxyalkyl, $R_1$ represents $$-A-X_1 \quad (2)$$

$$-\langle\!\!\bigcirc\!\!\rangle-B-X_2 \quad (3)$$

$$-\langle\!\!\bigcirc\!\!\rangle-D-B-X_2 \quad (4)$$

$$-\langle\!\!\bigcirc\!\!\rangle-\overset{X_3}{\underset{|}{N}}-B-X_2 \quad (5)$$

$$-\langle\!\!\bigcirc\!\!\rangle-\overset{X_3}{\underset{|}{N}}-D-B-X_2 \quad (6)$$

or $$-\langle\!\!\bigcirc\!\!\rangle-X_4 \quad (7)$$

wherein

A represents an alkylene connected to $X_1$;
$X_1$ represents hydroxyl, amino, alkylamino or a non-dissociated group-substituted on an alkylamino group;
B represents an alkylene group connected to $X_2$;
$X_2$ represents hydroxyl;
D represents $-SO_2-$ or $-CO-$;
$X_3$ represents hydrogen, alkyl or hydroxyalkyl;
$X_4$ represents amino, alkylamino or hydroxyl substituted alkyl amino;
$R_2$ represents hydrogen or alkyl;
$R_3$ represents alkyl or a non-dissociated group substituted on an alkyl group;
$x$ represents an integer from 1–4;
$y$ represents 0 or an integer from 1–3; and
$x+y$ is 1, 2, 3, or 4, with the free polyisocyanate functional groups of a polyurethane leather substrate.

BACKGROUND OF THE INVENTION

Field of the Invention

This invention relates to a process for preparing a colored polyurethane synthetic leather.

Description of the Prior Art

Various pigments or dyes have been used to color synthetic polyurethane leather. However, the use of pigments have produced a number of disadvantages. Pigments generally do not contain solubilizing groups, so often large particles of the pigments will form secondary and tertiary particle aggregations during product production. This particle aggregation is particularly prominent in the drying step. Usually, it is difficult to reduce the aggregated particles to a primary particle size by simple mechanical crushing. Because of these difficulties, polyurethane leathers dyed with conventional pigments often easily lose their color or result in dark, unsuitable colors. Even if these disadvantages are overcome such as by addition of dispersing agents into the pigments, the water and oil resistance of the synthetic leather product will be decreased which results in dissolution, bleeding or color migration of the coloring agent. These factors adversely affect product quality.

Dyes, on the other hand, usually have solubilizing groups within the molecule which facilitates dispersion of the dye in oil or water. However, dyes have the disadvantage in that they impart low weather durability, water resistance, oil resistance, and bleeding resistance to the leather. For these reasons, no completely satisfactory method has been developed for the coloring of synthetic leather products. Conventional practice has called for the use of coats of nylon or polyurethane on top of the colored urethane leather to prevent bleeding of the coloring agent. To further complicate matters, satisfactory top coats have not been developed. In spite of these disadvantages, dyes still are the most prominent coloring agents used for synthetic polyurethane leather products because of their excellent clear hue and transparency and because of the variety of colors available.

A need continues to exist, however, for new techniques of coloring synthetic leathers which have good solubility, dispersibility, water resistance, oil resistance and weather durability and which have a very clear hue which will not bleed from the leather.

SUMMARY OF THE INVENTION

Accordingly, one object of the invention is to provide a process for preparing a colored synthetic leather having excellent weather durability, water or oil resistance, bleeding resistance and a clear hue.

Another object of the invention is to provide a process for preparing a colored polyurethane synthetic leather wherein the dye is bonded to the polymer.

Briefly, these objects and other objects of the invention as hereinafter will become more readily apparent can be attained by a process for preparing a colored polyurethane synthetic leather by treating the leather with a complex copper phthalocyanine dye having the formula $$\text{CuPc} \begin{matrix} (SO_2NRR_1)_x \\ (SO_3^{\ominus}NH^{\oplus}R_2R_3)_y \\ | \\ H \end{matrix} \quad (1)$$

wherein CuPc represents a chlorinated or nonchlorinated copper phthalocyanine moiety; R represents hydrogen, alkyl, or hydroxyalkyl, $R_1$ represents $$-A-X_1 \quad (2)$$

$$-\langle\!\!\bigcirc\!\!\rangle-B-X_2 \quad (3)$$

$$-\langle\!\!\bigcirc\!\!\rangle-D-B-X_2 \quad (4)$$

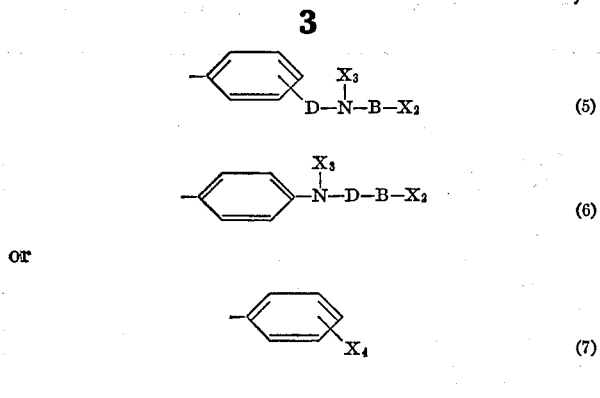

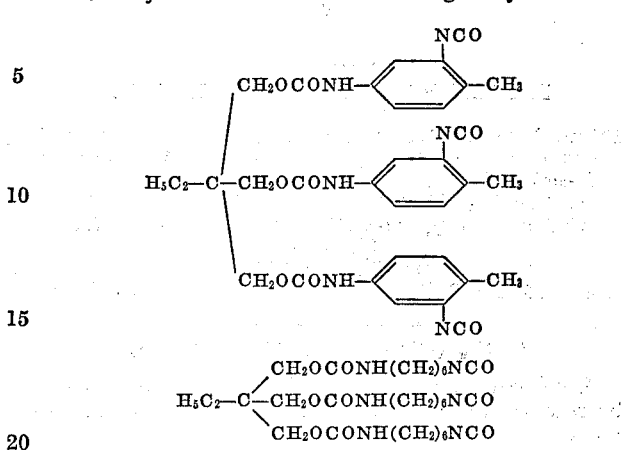

wherein A represents an alkylene group connected to $X_1$, $X_1$ represents hydroxyl, amino, alkylamino or a non-dissociated group substituted on an alkylamino group, B represents an alkylene group connected to $X_2$, $X_2$ represents hydroxyl, D represents $-SO_2-$ or $-CO-$, $X_3$ represents hydrogen, alkyl or hydroxyalkyl and $X_4$ represents amino, alkylamino or hydroxyl substituted alkyl amino; $R_2$ represents hydrogen or an alkyl group; $R_3$ represents an alkyl group or a non-dissociated group substituted on an alkyl group; $x$ represents an interger of 1–4; $y$ represents 0 or an interger from 1–3 and $x+y$ is 1, 2, 3 or 4. The alkyl group is preferably a lower alkyl group having 1–15 carbon atoms. The term "Alkylene" is intended to refer to "substituted alkylene."

DETAILED DESCRIPTION OF THE PREFERRED EMBODIMENTS

In the process of forming the colored polyurethane dye of this invention, a complex copper phthalocyanine dye having the formula shown is reacted with a polyisocyanate which in turn can be reacted with a polyurethane. The copper phthalocyanine complex dye can be combined with the polyisocyanate and the polyurethane by any suitable procedure. In one typical procedure, the complex copper phthalocyanine dye is mixed with a polyisocyanate, a polyol and a solvent, and the resulting solution is coated on a substrate such as a film, sheet, plate, or the like. A polyurethane is formed by the reaction of the polyisocyanate and the polyol. Another conventional procedure is to mix the complex copper phthalocyanine dye with a polyisocyanate, a polyurethane and a solvent, and the resulting solution is coated on a substrate. Still another conventional procedure is to mix the complex copper phthalocyanine dye with a polyurethane and a solvent, and the solution obtained is coated on a substrate A solution of a polyisocyanate or a mixture of a polyisocyanate and a polyurethane in a solvent is then coated on the coated membrane. By this procedure, the polyisocyanate is reacted with the complex copper phthalocyanine dye.

The polyisocyanates which are used in this invention include aromatic isocyanates, aliphatic isocyanates and multi-functional compounds derived from isocyanates. Suitable aromatic isocyanates include 2,4-tolylene diisocyanate, 2,6-tolylene diisocyanate, 1,5-naphthalene diisocyanate, cumene-2,4-diisocyanate, 4-methoxy-1,3-phenylene diisocyanate, 4-chloro-1,3-phenylene diisocyanate, 4-ethoxy-1,3-phenylene diisocyanate, biphenylene-4,4'-diisocyanate, 3-nitro-biphenylene-4,4'-diisocyanate, 4,4'-methylene diphenyl diisocyanate, 3,3'-dimethyl-4,4'-diisocyanate diphenyl, 4,4'diisocyanate diphenyl ether and triphenylmethane triisocyanate. Suitable aliphatic isocyanates include hexamethylene diisocyanate, tetramethylene diisocyanate, decamethylene diisocyanate, 1,4-cyclohexylene diisocyanate, 4,4'-methylenedicyclohexyl diisocyanate, p-xylene diisocyanate, and 1,4-phenylendiethylene diisocyanate.

The multi-functional compounds which are derived from isocyanates include the following isocyanates which are prepared by reacting 2,4-tolylene diisocyanate or hexamethylene diisocyanate with trimethylol propane. The polyols such as trimethylol propane which are used in this invention can be essentially linear hydroxy terminated polyesters. Representative of these polyester diols are those which are obtained by esterification of aliphatic dibasic acids or anhydrides thereof with a glycol. Preferably the glycol is employed in amounts in excess of the stoichiometric quantities required for reaction with the acid or anhydride in order to ensure that the polyesters are completely hydroxyl terminated. Suitable dicarboxylic acids (or anhydrides) or dibasic acids which are employed in the preparation of the polyester diols are adipic, succinic, pimelic, suberic, azelaic, sebacic, and terephthalic acids and mixtures thereof, or their anhydrides. Adipic acid is the preferred acid. Suitable glycols which are employed in the preparation of the polyester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, and decane-1,10-diol, and mixtures of two or more glycols. A preferred group of polyester diols are those which are obtained by esterifying adipic acid with an excess of glycol over the stoichoimetric amount required to react with the acid wherein 9 parts of ethylene glycol are reacted with 1 part of propane-1,2-diol.

In the procedure of the invention colored polyurethane products are formed by the reaction of the polyisocyanate component with the complex copper phthalocyanine dye and also with the polyurethane substrate or a polyol component. The choice of reaction conditions for the process of coloring the synthetic leather is determined by the type of synthetic leather used, which also determines the ratio of polyisocyanate to polyol and polyurethane used. Various conventional procedures can be used for preparing synthetic polyurethane leather products. Basically, however, the complex copper phthalocyanine dye is reacted with the polyisocyanate which in turn is reacted with the polyurethane or the polyol. Because the procedures for forming the polyurethane synthetic leather products are well known in the art, no further elaboration of the various synthetic procedures will be provided here.

The process of coloring the synthetic leather products of this invention are completely different from the conventional methods of coloring synthetic polyurethane leather.

In the conventional coloring methods, the leather is colored by simply dispersing or solubilizing the pigment or dye in the synthetic leather composition.

However, in this invention, the copper phthalocyanine dye bonds to the synthetic leather substrate by the reaction between free isocyanate groups in the polyisocyanate component of the synthetic leather and the isocyanate reactive amino, alkylamino (including substituted alkylamino) or hydroxyl groups of the complex copper phthalocyanine dye. By "alkylamino," of course is intended to include the substituted alkylamino having substituents which do not interfere with the reactions. The term "hydroxyl" is intended in its restrictive sense to mean alcoholic hydroxyl. By this procedure the phthalocyanine dye is firmly bonded to the synthetic leather. This type of bonding of the dye to the base is not unlike the bonding which occurs between dyes and substrates such as wool or cotton. This type of covalent bonding substantially improves the washing fastness and rubbing fastness of the product, and accordingly, bleeding of the dyed substrate is substantially decreased.

Various types of reactions involving the complex copper phthalocyanine dye and the polyurethane substrates are shown in the equations below.

(a)
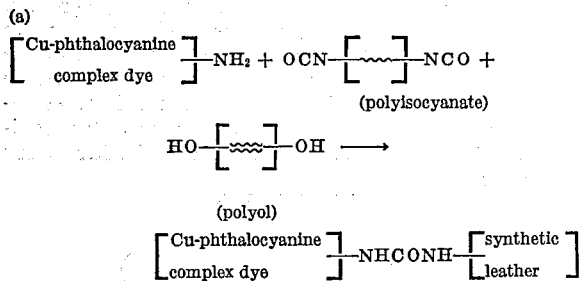

(b)
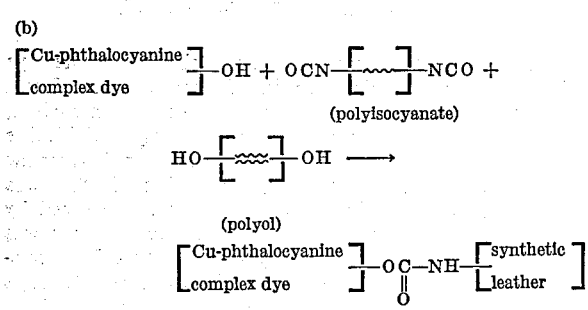

(c)
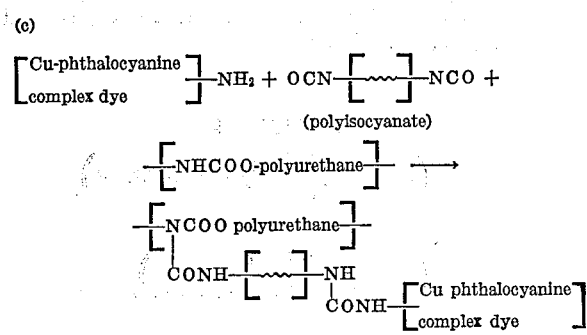

d)
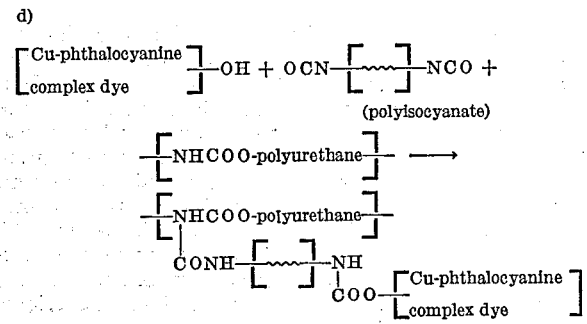

The complex copper phthalocyanine dye is chemically bonded to the synthetic base by the urea or urethane type bonds which are formed by the interaction of the functional groups on the phthalocyanine dye and the polyisocyanate component or polyurethane substrate. Because of the covalent bonds which are formed, almost no bleeding of the dye from the leather substrate occurs.

In the coloring process of the invention, at least one of the dyes of formula (1) is dissolved in a solvent which is inert to the polyisocyanate such as methylethyl ketone, ethylacetate, tetrahydrofuran, toluene, dimethylformamide, or the like and then, the polyisocyanate component and the polyol component are added to the mixture. The mixture is thoroughly blended and then it is coated uniformly on a substrate such as a polyvinylchloride sheet, a polyurethane sheet, a nylon sheet, cloth, a non-woven fabric, or the like. Thereafter the coated substrate is reacted at 50–80° C. for 4 hours, in order to form the desired synthetic leather product having a clear hue with no bleeding properties.

The complex dye having formula (1) wherein $x+y=4$ is prepared as follows. A copper phthalocyanine dye is dissolved in chlorosulfonic acid and is treated with thionylchloride to yield the 3,3′,3″,3‴-tetrasulfochloride derivative of copper-phthalocyanine. When $y=0$, the tetrasulfochloride derivative of copper-phthalocyanine reacts with an amine to yield the desired dye. When $y=1–3$, the tetrasulfochloride derivative of copper-phthalocyanine reacts with an amine in the following proportions wherein when $y=1$, 3 equivalents of the amine are reacted, when $y=2$, 2 equivalents of the amine are reacted, and when $y=3$, 1 equivalent of the amine is reacted. When the amine used is a diamine, a diamine mono-hydrochloride is used. Any residual sulfochloride is hydrolyzed with an aqueous solution of sodium hydroxide. The product complex copper phthalocyanine dye is thus obtained by the reaction of the sulfonated copper phthalocyanine with an amine.

The complex dyes having formula (1) wherein $x=1$, $y=0$ and $x+y=1$, 2 or 3 are prepared as follows. Mono-, di- or tri-sulfonic acid-substituted copper phthalocyanine dyes are prepared by sulfonating copper phthalocyanine with chlorosulfonic acid, and then reacting the product with an amine in the same manner as set forth in the case of $x+y=4$.

Having generally described this invention, a further understanding can be obtained by reference to certain specific examples which are provided herein for purposes of illustration only and are not intended to be limiting unless otherwise specified. In the examples, the terms "part" and "percent" mean part by weight and percent by weight respectively. All of the products prepared in this invention were tested by the folowing tests.

BLEEDING TEST

A 5 x 5 cm. colored synthetic leather was covered with a polyvinylchloride sheet and a 1 kg. of weight was placed on the sheet at 80° C. for 5 hours. The coloring degree of the polyvinyl chloride caused by bleeding of the synthetic leather substrate was observed.

WATER BLEEDING TEST

A 5 x 5 cm. colored synthetic leather was covered with a wet white silk cloth, and a 1 kg. of weight was placed on the wet cloth at 25° C. for 5 hours. The coloring degree of the silk cloth caused by bleeding of the leather substrate was observed.

The polyurethanes used in the examples are as follows:

(Nippolane 5121), a polyurethane prepared by reacting diphenyl-methane-diisocyanate with polybutyleneadipate, and
(Nippolane 5034), a polyol prepared by reacting tolylene-diisocyanate with the adipic acid coester of ethyleneglycol and diethyleneglycol.

EXAMPLE 1–A

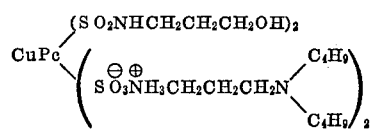

0.5 part of a complex copper phthalocyanine dye shown above was dissolved in a mixture of 10 parts of methylethyl ketone and 10 parts of dimethylformamide.

1.2 parts of a polyisocyanate (urethane triisocyanate prepared by reacting 1 mole of trimethylolpropane with 3 moles of 2,4-tolylene-diisocyanate with a purity of 74.6% in 25.4% ethyl acetate—Colonate L manufactured by Nippon Polyurethane Ind., Co.) and 20 parts of a polyol (Nippolane 5034 manufactured by Nippon Polyurethane Ind., Co.) were added to the solution to form a uniform mixture. The urethane composition solution containing the complex dye was uniformly coated on a polyvinylchloride sheet and dried at 80° C. for 4 hours to yield a blue colored synthetic leather.

The resulting synthetic leather was compared with a colored synthetic leather prepared by the same process, except that a similar complex copper phthalocyanine dye was usd which contained no hydroxyl groups. The two types of leather products were tested by the bleeding tests disclosed. The tests results showed significant differences in the bleeding properties of the two substrates. When the complex dye of this invention was used, no visible coloring of the polyvinylchloride sheet was found. On the other hand, when the complex dye containing no hydroxyl groups was used, the polyvinylchloride sheet was colored blue. When a nylon sheet was used instead of the polyvinylchloride sheet, similar results were obtained.

EXAMPLE 1-B 0.5 part of the copper phthalocyanine dye of Example 1-A was dissolved in 10 parts of dimethylformamide, and 10 parts of a solution of a polyurethane (Nippolane 5121 manufactured by Nippon Polyurethane Ind., Co.) was added to the binary composition to form a uniform solution.

The polyurethane solution containing the complex dye was coated onto the polyvinylchloride sheet and was dried at 110° C. for 5 minutes. The colored polyurethane synthetic leather was coated with a solution of 10 parts of a solution of a polyurethane, 0.6 parts of a polyisocyanate compound prepared by reacting 1 mole of trimethylolpropane with 3 moles of 2,4 - tolylenediisocyanate (Colonate L) and 6 parts of ethylacetate.

The coated synthetic leather was dried at 110° C. for 5 minutes and a blue colored synthetic leather was obtained which did not bleed when treated by both bleeding tests.

On the other hand, when the polyisocyanate compound was not added to the coating solution, bleeding of the complex dye was found. When a similar complex dye containing no amino groups was used, bleeding of the complex dye was found in both bleeding tests.

When a polyvinylchloride sheet was used as a substrate instead of the polyurethane sheet, similar results were obtained.

EXAMPLE 1-C 0.5 part of the copper phthalocyanine dye of Example 1-A was dissolved in 10 parts of methylethylketone. 10 parts of dimethylformamide and 10 parts of polyurethane (Nippolane 5121) were added to the mixture to form a uniform solution, and then 1.2 parts of a polyisocyanate (urethanetriisocyanate prepared by reacting 1 mole of trimethylolpropane with 3 moles of 2,4 - tolylenediisocyanate) was added to form a polyurethane solution containing the coloring material. The resulting polyurethane solution was coated on a polyvinylchloride sheet and was cured at 80° C. for 4 hours. A blue colored synthetic leather was obtained which did not bleed when treated by either bleeding test.

EXAMPLE 2

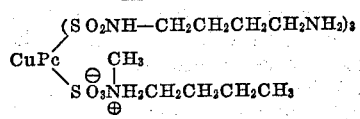

0.8 part of the complex copper phthalocyanine dye shown above was dissolved in a mixture of 5 parts of methylethyl ketone, 10 parts of dimethylformamide and 5 parts of ethylacetate. The solution was used to prepare a urethane composition solution, and the solution was coated on a polyurethane sheet by the procedure of Example 1. A clear blue colored synthetic leather was obtained. The resulting synthetic leather was compared with a colored synthetic leather prepared by the same process, except that a similar complex copper phthalocyanine dye was used which contained no amino group. Both of the prepared leather substrates were treated by both bleeding tests. The test results showed significant differences between the two leather substrates wherein no visible bleeding was detected for the colored synthetic leather of this invention.

EXAMPLE 3

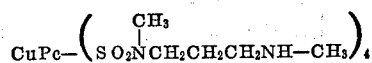

0.5 part of the complex copper phthalocyanine dye shown above was dissolved in 20 parts of methylethyl ketone, and was treated by the procedure of Example 1, and the solution was coated onto a polyvinylchloride sheet as in Example 1. A clear, blue colored synthetic leather was obtained. The resulting synthetic leather was compared with a colored synthetic leather prepared by the same process except that a similar complex dye was used which contains no methylamino group. Both synthetic leather products were tested for bleeding. The tests showed significant differences between the two products in that no visible bleeding was found for the colored synthetic leather of this invention.

EXAMPLE 4

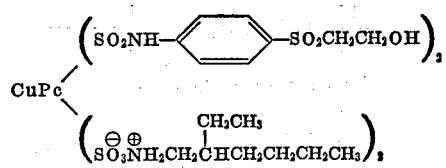

0.5 part of the complex copper phthalocyanine dye shown above was dissolved in 20 parts of dimethylformamide and was treated by the procedure of Example 1, and the solution was coated on a polyurethane sheet as in Example 1. A clear, blue colored synthetic leather was obtained. The resulting synthetic leather was compared with a colored synthetic leather prepared by the same process except that a similar complex dye was obtained which contained no hydroxyl group. Both leather products were tested by the bleeding tests. As expected significant differences between the two products were found, wherein no visible bleeding was found for the colored synthetic leather of this invention.

EXAMPLES 5-26

The complex copper phthalocyanine dyes shown in the table were used to prepare colored synthetic leathers by the process of Example 1. Bleeding tests showed no visible bleeding for each of the clear colored synthetic leather products prepared.

| Example | Formula of dye |
|---|---|
| 5 | $CuPc\begin{pmatrix}SO_2N{-}CH_2CH_2OH \\ \phantom{SO_2N}CH_2CH_2OH\end{pmatrix}$ $\begin{pmatrix}SO_3^\ominus\overset{\oplus}{\underset{CH_3}{N}}H_2CH_2CH_2CH_2OH\end{pmatrix}_3$ |
| 6 | $CuPc\begin{pmatrix}(SO_2NHCH_2CH_2CH_2CH_2NHCH_3)_2 \\ \left(SO_3^\ominus\overset{\oplus}{\underset{H}{N}}H_2CH_2CH_2CH_2CH_2CH_2CH_2CH_3\right)_2\end{pmatrix}$ |
| 7 | $CuPc\begin{pmatrix}(SO_2NHCH_2CH_2CH_2NHCH_2CH_2OH)_2 \\ SO_3^\ominus\overset{\oplus}{\underset{CH_3}{N}}H_2CH_2CH_2CH_2OH\end{pmatrix}$ |
| 8 | $CuPc\begin{pmatrix}SO_2N{-}CH_2CH_2OH \\ \phantom{SO_2N}CH_2CH_2N(CH_2CH_2OH)_2 \\ \left(SO_3^\ominus\overset{\oplus}{\underset{H}{N}}H_2CH_2CH_2CH_2NHCH_2CH_2OH\right)_2\end{pmatrix}$ |
| 9 | $CuPc\begin{pmatrix}(SO_2NH{-}\text{C}_6\text{H}_5) \\ \left(SO_3^\ominus\overset{\oplus}{\underset{H}{N}}H_2{-}\underset{\underset{CH_2CH_3}{|}}{\overset{H}{C}}{-}CH_2CH_2CH_3\right)_2\end{pmatrix}$ |
| 10 | $CuPc\begin{pmatrix}\left(SO_2NH{-}\text{C}_6\text{H}_4{-}CH_2CH_2CH{-}CH_2OH\right)_2 \\ \phantom{XXXXXXXXXXXXXXX}OH \\ \left(SO_3^\ominus\overset{\oplus}{\underset{H}{N}}HC_{18}H_{37}\right)_2\end{pmatrix}$ |
| 11 | $CuPc\begin{pmatrix}\left(SO_2NHCH_2CH{-}CH_2OH\right)_2 \\ \phantom{XXXXX}OH \\ \left(SO_3^\ominus\overset{\oplus}{\underset{CH_3}{N}}H_2CH_2CH_2CH_2NHCH_3\right)_2\end{pmatrix}$ |
| 12 | $CuPc\begin{pmatrix}\left(SO_2NH{-}\text{C}_6\text{H}_4{-}COCH_2CH_2OH\right)_2 \\ SO_3^\ominus\overset{\oplus}{\underset{H}{N}}HCH_2\underset{\underset{CH_2CH_3}{|}}{CH}CH_2CH_2CH_3\end{pmatrix}$ |
| 13 | $CuPc\left(SO_2NH{-}\text{C}_6\text{H}_4{-}SO_2NHCH_2CH_2OH\right)_2$ |
| 14 | $CuPc\begin{pmatrix}\left(SO_2NH{-}\text{C}_6\text{H}_4{-}SO_2N\begin{array}{l}CH_2CH_2OH \\ CH_2CH_2OH\end{array}\right)_2 \\ SO_3^\ominus\overset{\oplus}{\underset{H}{N}}HCH_2\underset{\underset{CH_3}{|}}{CH}CH_2CH_2CH_3\end{pmatrix}$ |
| 15 | $CuPc\begin{pmatrix}\left(SO_2NH{-}\text{C}_6\text{H}_4{-}CONHCH_2CH_2OH\right)_2 \\ \left(SO_3^\ominus\overset{\oplus}{\underset{CH_3}{N}}HCH_2CH_2CH_2NHCH_3\right)_2\end{pmatrix}$ |
| 16 | $CuPc\begin{pmatrix}\left(SO_2NH{-}\text{C}_6\text{H}_4{-}SO_2\underset{CH_3}{N}CH_2CH_2OH\right)_2 \\ \left(SO_3^\ominus\overset{\oplus}{\underset{H}{N}}HCH_2CH_2CH_2N\begin{array}{l}C_4H_9 \\ C_4H_9\end{array}\right)_2\end{pmatrix}$ |

TABLE—Continued

| Example | Formula of dye |
|---|---|
| 17 | $CuPc\begin{pmatrix}SO_2NH-\phenyl-CON\begin{smallmatrix}CH_2CH_2OH\\CH_2CH_2OH\end{smallmatrix}\end{pmatrix}$ $\begin{pmatrix}SO_3^{\ominus}\overset{\oplus}{\underset{H}{N}}H\begin{smallmatrix}CH_2CH_2CH_2NHCH_2CH_2OH\\CH_2CH_2CH_2NHCH_2CH_2OH\end{smallmatrix}\end{pmatrix}_2$ |
| 18 | $CuPc\begin{pmatrix}SO_2NH-\phenyl-\underset{CH_2CH_2OH}{N}-SO_2CH_2CH_2OH\end{pmatrix}_2$ $\begin{pmatrix}SO_3^{\ominus}\overset{\oplus}{\underset{H}{H}}NCH_2CH_2CH_2NHCH_2CH_2OH\end{pmatrix}_2$ |
| 19 | $CuPc\begin{pmatrix}SO_2NH-\phenyl-SO_2\underset{}{N}CH_2CH_2\underset{OH}{CH}-CH_2OH\\\quad CH_3\end{pmatrix}_2$ $\begin{pmatrix}SO_3^{\ominus}\overset{\oplus}{\underset{H}{H}}NCH_2CH_2CH_2CH_2CH_2\overset{X}{\underset{}{CH}}CH_3\end{pmatrix}_2$ |
| 20 | $CuPc\begin{pmatrix}SO_2NH-\phenyl-NHCOCH_2CH_2OH\end{pmatrix}_2$ $\begin{pmatrix}SO_3^{\ominus}\overset{\oplus}{\underset{H}{H}}NCH_2\underset{CH_2CH_3}{CH}CH_2CH_2CH_3\end{pmatrix}_2$ |
| 21 | $CuPc\begin{pmatrix}SO_2NH-\phenyl-\underset{CH_3}{N}SO_2CH_2CH_2OH\end{pmatrix}_2$ $\begin{pmatrix}SO_3^{\ominus}\overset{\oplus}{\underset{}{H}}NHC_{16}H_{33}\end{pmatrix}_2$ |
| 22 | $CuPc\begin{pmatrix}SO_2NH-\phenyl-\underset{COCH_2CH_2OH}{\overset{CH_2CH_2OH}{N}}\end{pmatrix}$ $\begin{pmatrix}SO_3^{\ominus}\overset{\oplus}{\underset{H}{H}}NCH_2CH_2CH_2-N\begin{smallmatrix}C_4H_9\\C_4H_9\end{smallmatrix}\end{pmatrix}_2$ |
| 23 | $CuPc\begin{pmatrix}SO_2NH-\phenyl-NH_2\end{pmatrix}_2$ $\begin{pmatrix}SO_3^{\ominus}\overset{\oplus}{\underset{H}{H}}NCH_2\underset{CH_2CH_3}{CH}CH_2CH_2CH_3\end{pmatrix}_2$ |
| 24 | $CuPc\begin{pmatrix}SO_2NH-\phenyl-NHCH_2CH_3\end{pmatrix}_2$ $\begin{pmatrix}SO_3^{\ominus}\overset{\oplus}{\underset{H_2}{H}}NCH_2CH_2CH_2CH_2CH_2CH_2CH_3\end{pmatrix}_2$ |
| 25 | $CuPc\begin{pmatrix}SO_2NHCH_2CH_2CH_2CH_2NH_2\end{pmatrix}_2$ |
| 26 | $CuPc-SO_2N\begin{smallmatrix}CH_2CH_2CH_2OH\\CH_2CH_2CH_2OH\end{smallmatrix}$ |

EXAMPLE 27

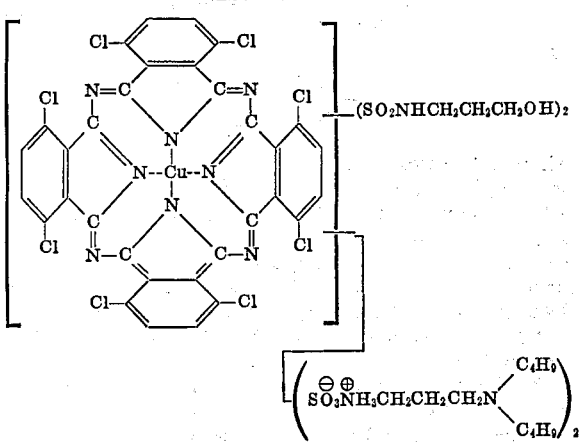

0.5 part of the chlorinated copper phthalocyanine dye shown above was dissolved in 20 parts of dimethylformamide, and was treated by the process of Example 1. The solution was coated onto a polyvinylchloride sheet and a clear, bluish-green colored synthetic leather was obtained.

The resulting synthetic leather was compared with a colored synthetic leather prepared by the same process except that a similar complex dye was used which contained no hydroxyl group. Both leather products were tested by the bleeding tests. Significant differences were found between the two products in that only the colored synthetic leather of this invention showed no bleeding.

The copper phthalocyanine complex dye of Example 1 was prepared by the following process. 57.5 parts of copper phthalocyanine was dissolved in 205 parts of chlorosulfonic acid and was reacted at 135–140° C. for 3 hours. 98 parts of thionylchloride was added to the reaction mixture at 90–95° C. over 4 hours, and the resulting reaction mixture was cooled. 2000 parts of ice water were then added, and the precipitated copper phthalocyanine-3,3′,3″,3‴-tetrasulfochloride was filtered and washed with ice water until the wash solutions were neutral. The resulting sulfochloride paste was mixed with 1000 parts of water to form a slurry. 15 parts of n-propanolamine and 0.8 part of pyridine was added to the stirred slurry at 20–25° C. 1 N NaOH was added to the mixture and the components were reacted at pH 9.0–9.5 for 1 hour to form the CuPc-sulfonamide. The reaction mixture was heated to 80° C., and 100 volumes of 1 N NaOH was added. Any residual sulfochloride groups were hydrolyzed to sulfonic acid groups by that treatment. After cooling, hydrochloric acid was added to the reaction mixture until the solution was acidic. The precipitated copper phthalocyanine sulfonic acid was filtered and washed with water. 37.7 parts of N,N-dibutylaminopropylamine were added to 1000 parts of water and the pH was adjusted to 7.5 with acetic acid. This suspension was added to the CuPc sulfonic acid product in 1000 parts of water, and a salt was formed by stirring the mixture at 60–70° C. for 2 hours. The precipitated complex dye was filtered at room temperature, washed with water and dried at 70° C. 111 parts of the dye of Example 1 were obtained.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. In a process for preparing a colored polyurethane leather by reacting a polyisocyanate with a polyol or a polyurethane, the improvement which comprises reacting said polyisocyanate with a copper phthalocyanine dye having the formula

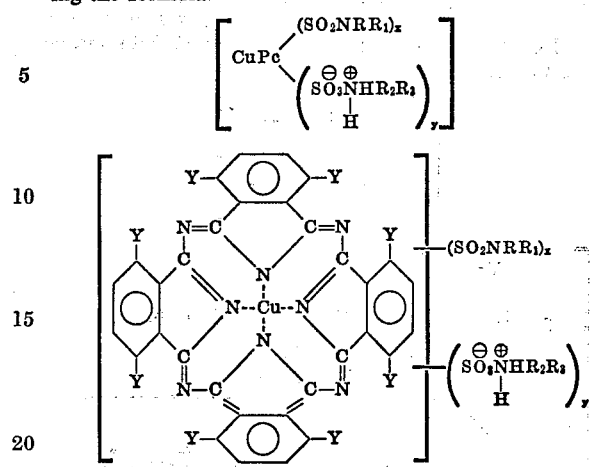

wherein Y is hydrogen or chlorine; R represents hydrogen, alkyl or hydroxyalkyl, $R_1$ represents

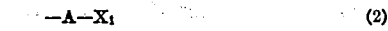  (2)

  (3)

  (4)

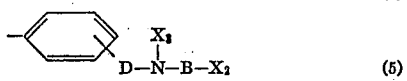  (5)

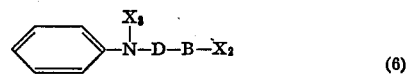  (6)

or

  (7)

wherein A represents alkylene connected to $X_1$, $X_1$ represents hydroxyl, amino or alkylamino, B represents an alkylene group connected to $X_2$, $X_2$ represents hydroxyl; D represents $-SO_2-$ or $-CO-$, $X_3$ represents hydrogen, alkyl or hydroxyalkyl, $X_4$ represents amino, alkylamino or hydroxyl substituted alkyl amino, $R_2$ represents hydrogen or alkyl, $R_3$ represents alkyl or alkylamino; $x$ represents an integer from 1–4; $y$ represents 0 or an integer from 1–3 and $x+y$ is 1, 2, 3, or 4.

2. The process of Claim 1, wherein the terminal hydroxyl groups of said complex copper phthalocyanine dye are reacted with said polyisocyanate which is also bonded to said polyol or said polyurethane.

3. The process of Claim 1, wherein said complex copper phthalocyanine dye is mixed with said polyisocyanate, said polyol and a solvent and the resulting solution is coated on a substrate.

4. The process of Claim 1, wherein said complex copper phthalocyanine dye is mixed with said polyisocyanate said polyurethane and a solvent, and the resulting solution is coated on a substrate.

5. The process of Claim 1, wherein said complex copper phthalocyanine dye is mixed with said polyurethane and a solvent and the resulting solution is coated on a substrate over which is coated a solution of said polyisocyanate and said polyurethane.

6. The process of Claim 1, wherein the amount of said polyisocyanate mixed with said complex copper phthalocyanine dye is in excess of the equivalent amount required to react with the complex dye.

7. The process of Claim 1, wherein said complex dye is prepared by dissolving a copper phthalocyanine dye in chlorosulfonic acid, and then treating the dissolved dye first with thionylchloride and then with an amine.

8. A colored synthetic polyurethane leather which comprises the reaction product of a polyisocyanate with a polyol or a polyurethane with a copper phthalocyanine dye having the formula:

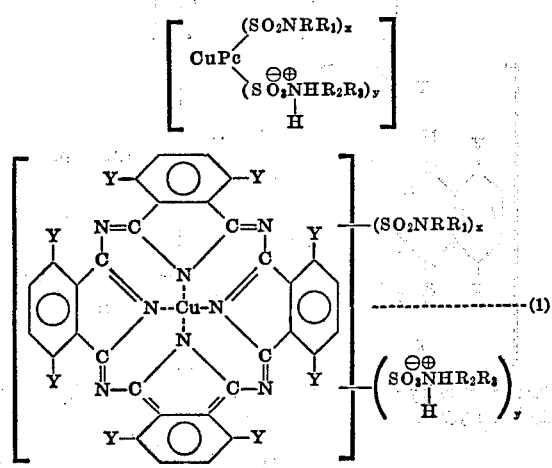

wherein Y is hydrogen or chlorine; R represents hydrogen, alkyl, or hydroxyalkyl, $R_1$ represents

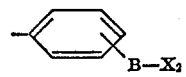 (2)

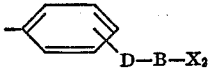 (3)

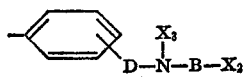 (4)

 (5)

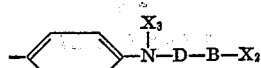 (6)

or

 (7)

wherein A represents alkylene connected to $X_1$, $X_1$ represents hydroxyl, amino, or alkylamino, B represents an alkylene group connected to $X_2$, $Y_2$ represents hydroxyl; D represents —$SO_2$— or —CO—, $X_3$ represents hydrogen, alkyl or hydroxyalkyl, $X_4$ represents amino, alkylamino or hydroxyl substituted alkyl amino, $R_2$ represents hydrogen or alkyl, $R_3$ represents alkyl or alkylamino; $x$ represents an integer from 1–4; $y$ represents 0 or an integer from 1–3 and $x+y$ is 1, 2, 3, or 4.

9. The polyurethane leather of Claim 8, wherein the terminal hydroxyl groups of said complex copper phthalocyanine dye are reacted with said polyisocyanate which is also bonded to said polyol or said polyurethane.

10. The polurethane leather of Claim 9, wherein said complex copper phthalocyanine dye is mixed with said polyisocyanate, said polyol and a solvent and the resulting solution is coated on a substrate.

References Cited

UNITED STATES PATENTS

| | | | |
|---|---|---|---|
| 3,674,783 | 7/1972 | Tobel | 260—314.5 |
| 3,679,675 | 7/1972 | Tobel | 260—314.5 |
| 3,445,449 | 5/1969 | Meininger | 260—314.5 |
| 3,737,437 | 6/1973 | Brachel | 260—314.5 |
| 3,660,427 | 5/1972 | Back | 260—314.5 |
| 3,558,666 | 1/1971 | Back | 260—314.5 |
| 3,730,950 | 5/1973 | Barnes | 260—37 N |

ALLAN LIEBERMAN, Primary Examiner

P. R. MICHL, Assistant Examiner

U.S. Cl. X.R.

117—161 KP; 260—37 P, 314.5